(12) United States Patent
D'Agostino et al.

(10) Patent No.: US 7,605,697 B2
(45) Date of Patent: Oct. 20, 2009

(54) WIRELESS TRANSCEIVER MANAGEMENT SYSTEM AND METHOD

(75) Inventors: Paul P D'Agostino, East Ayshire (GB); Norman L MacKenzie, Paisley (GB); Martin L Crisp, Motherwell (GB)

(73) Assignee: Honeywell International, Inc., Morristown, NJ (US)

( * ) Notice: Subject to any disclaimer, the term of this patent is extended or adjusted under 35 U.S.C. 154(b) by 350 days.

(21) Appl. No.: 11/796,406

(22) Filed: Apr. 26, 2007

(65) Prior Publication Data

US 2008/0266081 A1 Oct. 30, 2008

(51) Int. Cl.
*G08B 1/08* (2006.01)

(52) U.S. Cl. .............. 340/539.21; 340/5.61; 340/10.51; 340/539.13; 340/825.49; 455/456.1

(58) Field of Classification Search ................ 340/5.61, 340/10.51, 551, 10.52, 552, 539.13, 825.49, 340/573.4, 539.21; 455/456.1, 456.3, 456.5
See application file for complete search history.

(56) References Cited

U.S. PATENT DOCUMENTS

| | | | | |
|---|---|---|---|---|
| 5,801,626 | A * | 9/1998 | Addy ..................... | 340/539.21 |
| 6,294,992 | B1 * | 9/2001 | Addy et al. .............. | 340/539.3 |
| 6,396,413 | B2 * | 5/2002 | Hines et al. ............. | 340/825.49 |
| 6,529,164 | B1 * | 3/2003 | Carter ....................... | 342/463 |
| 6,574,482 | B1 * | 6/2003 | Radomsky et al. .......... | 455/517 |
| 6,914,533 | B2 * | 7/2005 | Petite ......................... | 340/628 |
| 6,973,053 | B1 * | 12/2005 | Passman et al. ............ | 370/310 |
| 7,003,315 | B2 * | 2/2006 | Kiyomoto et al. ......... | 455/552.1 |
| 7,038,584 | B2 * | 5/2006 | Carter .................... | 340/539.13 |
| 7,085,564 | B2 * | 8/2006 | Nishiyama et al. ........ | 455/432.1 |
| 7,088,955 | B2 * | 8/2006 | Challa et al. ............... | 455/63.3 |
| 7,119,658 | B2 * | 10/2006 | Stilp .......................... | 340/5.61 |
| 7,174,172 | B2 * | 2/2007 | Sharony et al. .......... | 455/456.1 |
| 7,373,154 | B2 * | 5/2008 | Sharony et al. .......... | 455/456.1 |
| 7,403,744 | B2 * | 7/2008 | Bridgelall .................. | 455/41.2 |
| 7,423,516 | B2 * | 9/2008 | Overhultz .................. | 340/10.5 |

* cited by examiner

*Primary Examiner*—Davetta W Goins
*Assistant Examiner*—Hoi C Lau
(74) *Attorney, Agent, or Firm*—Barkume & Associates, P.C.

(57) ABSTRACT

A method of managing data communications in a wireless security system. A message is transmitted from a fixed location security device and received by at least two transceivers. Each transceiver analyzes the received message to generate RSSI data. A digital message including the RSSI data is sent from each transceiver via a wired connection to a control panel, which analyzes the RSSI data from each transceiver to determine which transceiver generated the highest RSSI. The control panel then designates data exchange responsibility to the transceiver with the highest RSSI. That transceiver will have responsibility for acknowledging messages from that security device and send data to that security device from the control panel. A transceiver will be allocated to a portable security device if it is the first to receive the wireless message rather than on RSSI data.

19 Claims, 7 Drawing Sheets

WIRELESS TRANSCEIVER MANAGEMENT SYSTEM AND METHOD

TECHNICAL FIELD

This invention relates to wireless security and alarm systems, and in particular to a system and method for managing data communications between wireless security system devices and multiple wireless transceivers.

BACKGROUND ART

Security systems such as alarm systems often utilize wireless transmissions to and from devices such as motion detectors, keypads, door and window contacts, etc. The wireless devices communicate with a control panel (the device that controls the operation of the security system) via a series of strategically located wireless transceivers. The wireless transceivers have wireless receiving capabilities to receive transmissions from various wireless devices, and they have wireless transmission capabilities to send transmissions to various wireless devices. The wireless transceivers are interconnected to the control panel via a wired connection, such as an RS-485 wired connection.

In many security systems, a number of wireless transceivers will be strategically located in locations throughout the premises being protected. Once these transceivers are installed they are usually not moved again, since they are wired to the control panel and the cost of rewiring is prohibitive. The wireless security system devices are then installed as desired throughout the premises. Many of the wireless security system devices will be installed in fixed locations; some, however, are mobile devices (e.g. fobs) that may be carried throughout the premises by a user.

An important parameter in the operation of these wireless security systems is the communications between the devices and the transceivers, which in turn communicate with the control panel. Several problems may occur in this regard.

FIG. 1 illustrates a wireless coverage diagram, where transceivers 6a, 6b, and 6c are located in a premises and wired to a control panel 4. Various wireless security devices are shown by the black dots. Transceiver 6a provides coverage area 7, transceiver 6b provides coverage area 11, and transceiver 6c provides coverage area 13. Overlap is provided to ensure all desired areas of the premises are covered. Device 8 is within range of transceiver 6a, but device 8a is within range of both transceivers 6a and 6b.

When a device sends an RF transmission to a given transceiver, it will expect to receive an acknowledge message (ACK) in return. In addition, the control panel may need to send data signals to a certain device via a transceiver. Since a given wireless device may be in range of several transceivers as shown in FIG. 1, it is desired that only one transceiver send RF transmissions to that device at any time in order to avoid message collisions. Thus, even though several transceivers may receive RF transmissions from a device, it is desired that only one of those transceivers issue an ACK to that device. Preferably the device would receive transmissions from the transceiver with the best transmission parameters (i.e. the strongest signal with respect to that device).

Conditions may change that cause a desire to change the device-transceiver pairing assignment, such as if furniture is moved, etc. In that case it would be desired to reallocate the device-transceiver pairing assignment accordingly.

In addition, movable devices such as fobs will come into and out of range with different transceivers as the fob is transported throughout the premises.

Thus, it is desired to provide a wireless security system in which transceivers are dynamically allocated to fixed location bi-directional wireless devices in order to optimize data transmissions therebetween.

It is also desired to provide such a wireless system that optimizes transmissions between movable bi-directional fobs and fixed location transceivers.

DISCLOSURE OF THE INVENTION

The present invention in a first aspect is a method of managing data communications in a wireless security system. A wireless message is transmitted from a wireless security device and then received by at least two wireless transceivers. Each wireless transceiver that receives the wireless message then analyzes the received wireless message to generate received signal strength indication data. A digital data message is then sent via a wired connection such as a data bus to a control panel, the digital data message including at least some data from the received wireless message and the received signal strength indication data. The control panel receives each digital data message sent from the wireless transceivers and then analyzes the received signal strength indication data from each received digital data message to determine which wireless transceiver generated the highest received signal strength indication data. The control panel then designates data exchange responsibility to the wireless transceiver determined to have generated the highest received signal strength indication data. The control panel indicates to the wireless transceiver determined to have generated the highest received signal strength indication data that the wireless transceiver has been designated with data exchange responsibility with the wireless security device.

Only the designated wireless transceiver will transmit an acknowledgement message to that wireless security device. Further, subsequent wireless messages from the wireless security system device will be acknowledged only by that designated wireless transceiver.

While the first aspect of the invention described above is generally implemented using fixed location wireless security devices (such as PIRs or door contact switches), a second aspect of the invention applies to portable wireless security devices such as fobs. A wireless message is transmitted from a portable wireless security device and then received by a plurality of wireless transceivers. A digital data message is then sent via a wired connection such as a data bus to a control panel, the digital data message including at least some data from the received wireless message. Note that received signal strength indication data is not implemented in this aspect of the invention. The control panel receives each digital data message sent from the wireless transceivers and then determines which wireless transceiver was the first wireless transceiver to have sent the digital data message. The control panel then designates data exchange responsibility to the wireless transceiver determined to have been the first wireless transceiver to have sent the digital data message. The control panel indicates to the wireless transceiver determined to have been the first wireless transceiver to have sent the digital data message that the wireless transceiver has been designated with data exchange responsibility with the wireless security device.

A timeout clock may be initiated such that when the timeout clock reaches a predetermined time, then the control panel indicates to the designated wireless transceiver that the designated wireless transceiver no longer has been designated with data exchange responsibility with the wireless security device. Alternatively, a message counter may be implemented, which is incremented for each time a message is received from a portable wireless security device. When the message counter reaches a predetermined count, then the control panel indicates to the designated wireless transceiver that the designated wireless transceiver no longer has been designated with data exchange responsibility with the wireless security device.

BEST MODE FOR CARRYING OUT THE INVENTION

Figure 1:
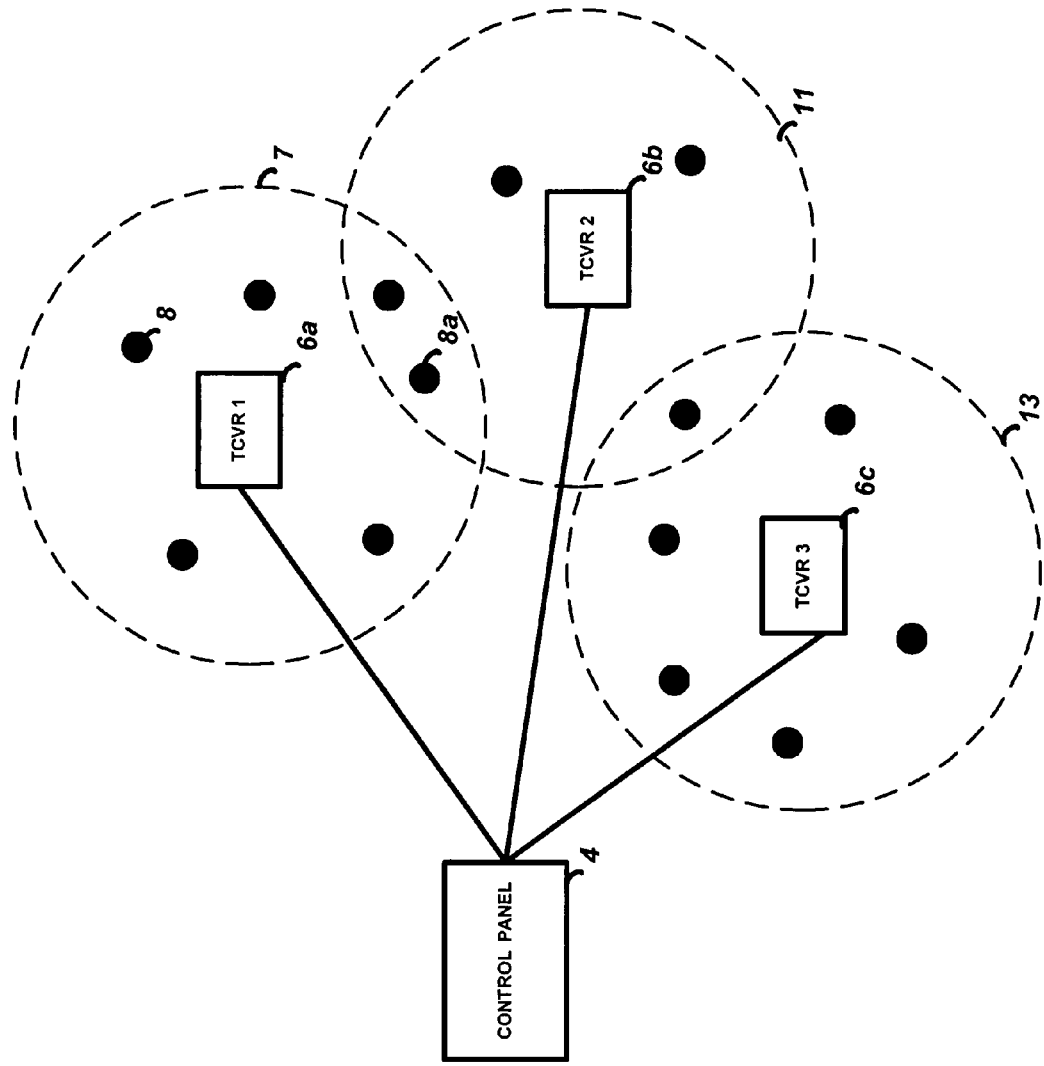
FIG. 1 is an illustration of the typical coverage areas of the wireless security system of the present invention.
Figure 2:
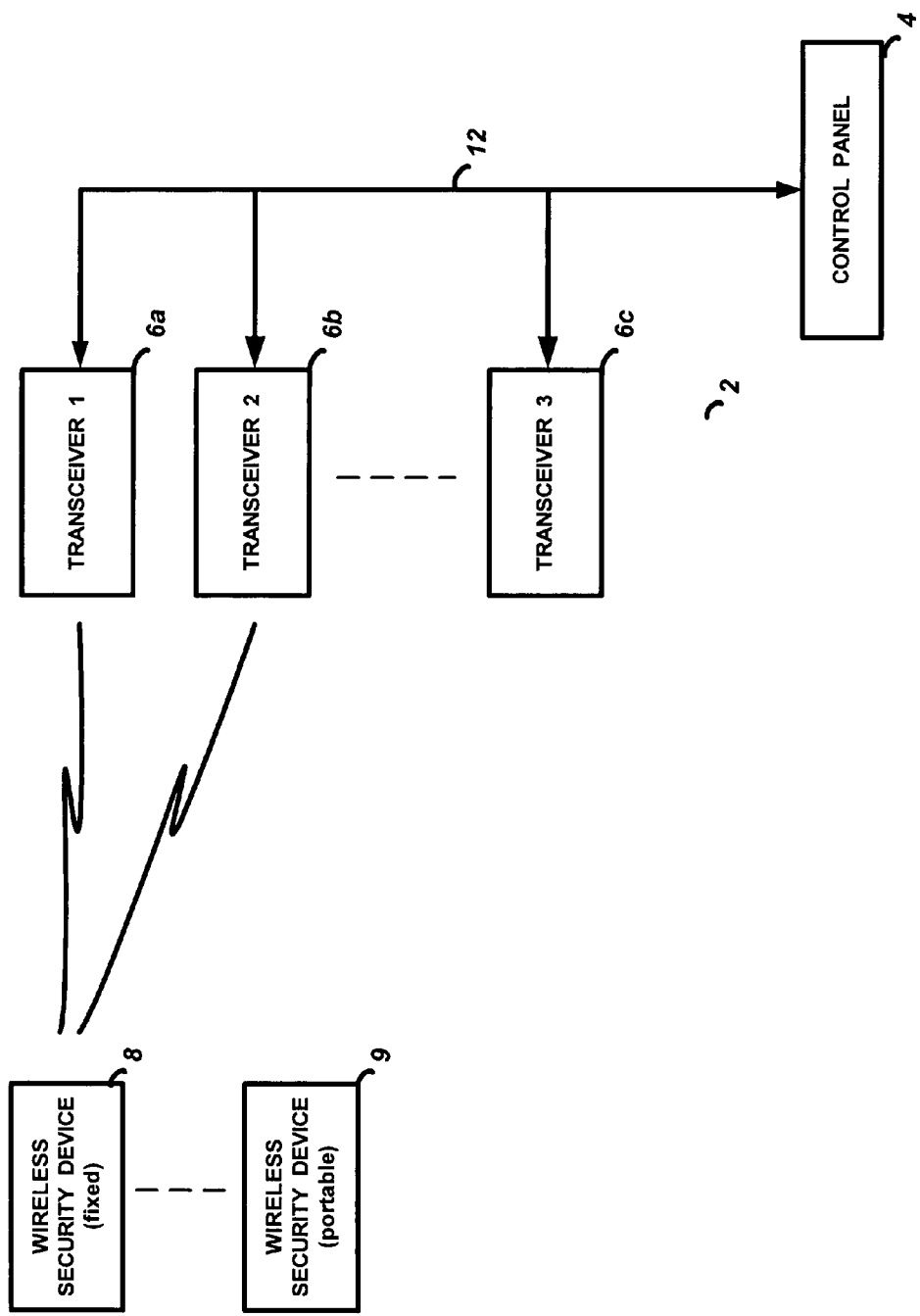
FIG. 2 is a block diagram of the wireless security system of the present invention.
Figure 3:
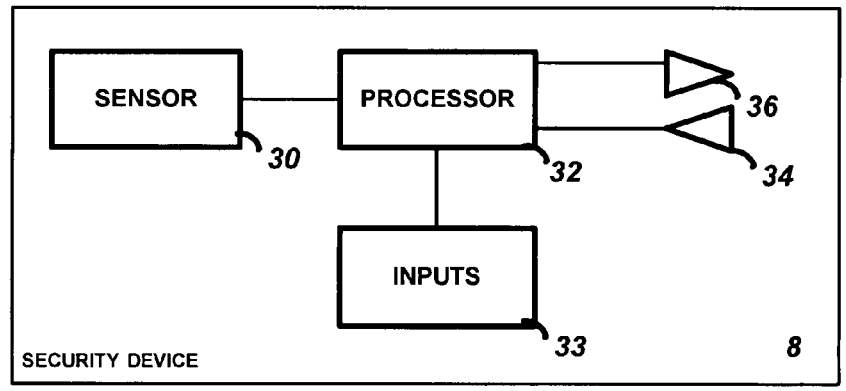
FIG. 3 is a block diagram of a wireless security device of the present invention.

The preferred embodiments of the present invention will now be described with respect to the Figures. FIGS. 1 and 2 illustrates a top level block diagram of a first aspect of the present invention. The security system 2 includes at least one, and likely many, wireless security devices 8. These wireless security devices 8 are known in the art, and include (as shown in FIG. 3) a sensor 30, processing circuitry 32, a wireless (e.g. RF) transmitter 36, and a wireless receiver 34. The sensor 30 is a generic representation of one or more of many types of devices such as passive infrared detectors (PIRs), microwave oscillators, door or window contact switches, glass break detectors, etc. Processing circuitry interoperates with the sensor 30 to generate a wireless message for transmission via the transmitter to the rest of the security system 2 as well known in the art, and may include device status, tamper status, battery status, etc. The receiver 34 enables the security device 8 to operate as a two-way device and receive messages from the system 2, including message acknowledgement messages (ACK), request for status messages, etc.

In this first aspect of the invention, the wireless security device 8 will be a fixed location device such as a PIR or door contact switch. These devices are mounted by an installer and generally not moved from the installed location. In a second aspect of the invention described below, the security device is portable, such as a fob that is carried by a user and used to control certain aspects of the system. Portable wireless security devices present unique problems that are addressed by the second aspect of the invention below.

Also shown in FIG. 2 are a plurality of wireless transceivers 6a, 6b, 6c, which are referred to generally as transceiver 6 for purposes of clarity. The transceivers 6 are strategically located throughout the premises based on the coverage desired; i.e. based on the locations of the wireless security devices 8 with which they will communicate. For example, a building with four floors and four wings on each floor may have one transceiver in each wing on each floor, resulting in sixteen transceivers. As security devices 8 are added to the system they will communicate and interoperate with the transceivers 6 as further described herein.

Figure 4:
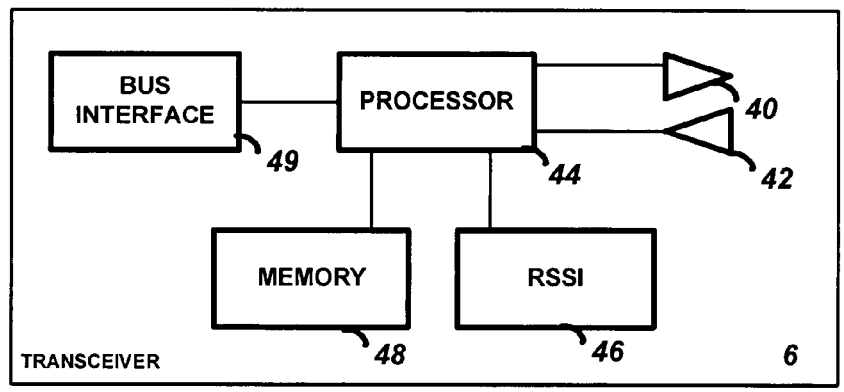
FIG. 4 is a block diagram of a wireless transceiver of the present invention.

FIG. 2 also illustrates a control panel 4 that is hardwired to each of the transceivers 6 via a bus 12. In the preferred embodiment an RS-485 wired bus is used, although many other types may be implemented in accordance with the desires of the system designer. FIG. 4 illustrates a wireless transceiver 6 that includes a receiver 40 for receiving messages transmitted by the wireless security devices 8, and a transmitter 42 for transmitting messages such as ACK back to the security device 8. The transceiver 6 also has processing circuitry 44, a received signal strength indication (RSSI) measurement circuit 46, memory 48, and a bi-directional bus interface 49 which can communicate over the bus 12 with the control panel via digital data messages. In the preferred embodiment, these digital data messages are sent via the RS-485 protocol that is well known in the art.

RSSI measurement techniques are also well known in the art. For example, U.S. Pat. No. 5,801,626, ALARM COMMUNICATIONS SYSTEM WITH SUPERVISION SIGNAL RSSI ANALYSIS, assigned to the same assignee as the present application, which is incorporated by reference herein, describes such an RSSI measurement circuit. This is an example only of such a circuit and the operation of the present invention is not limited to the use of that circuit.

Figure 5:
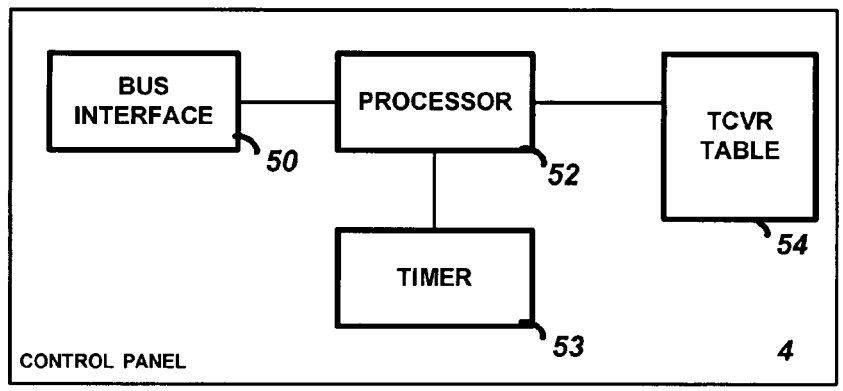
FIG. 5 is a block diagram of the control panel of the present invention.

FIG. 5 also illustrates the control panel 4. Control panels used in security and alarm system are well known in the art, and only the aspects of such a device relevant to the present invention are illustrated and discussed herein. Thus, the control panel 4 includes a bi-directional bus interface 50 that can communicate over the bus 12 with the transceivers 6 via digital data messages. The control panel 4 also has processing circuitry 52 and a memory 54 that stores a transceiver allocation table as further described below.

Figure 6A:
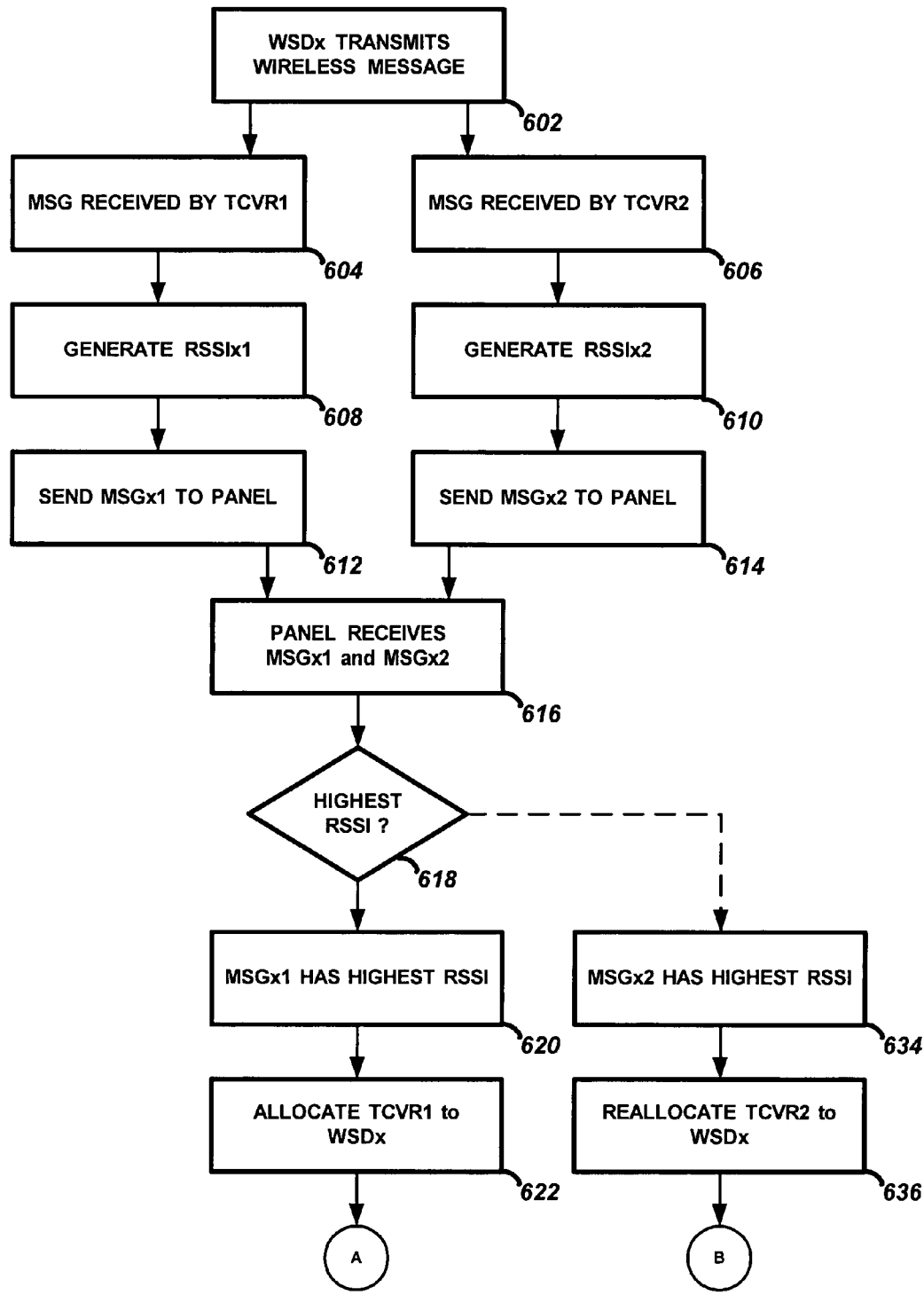
FIGS. 6a and 6b are a flowchart of the operation of a first aspect of the present invention used with fixed location security devices.
Figure 6B:
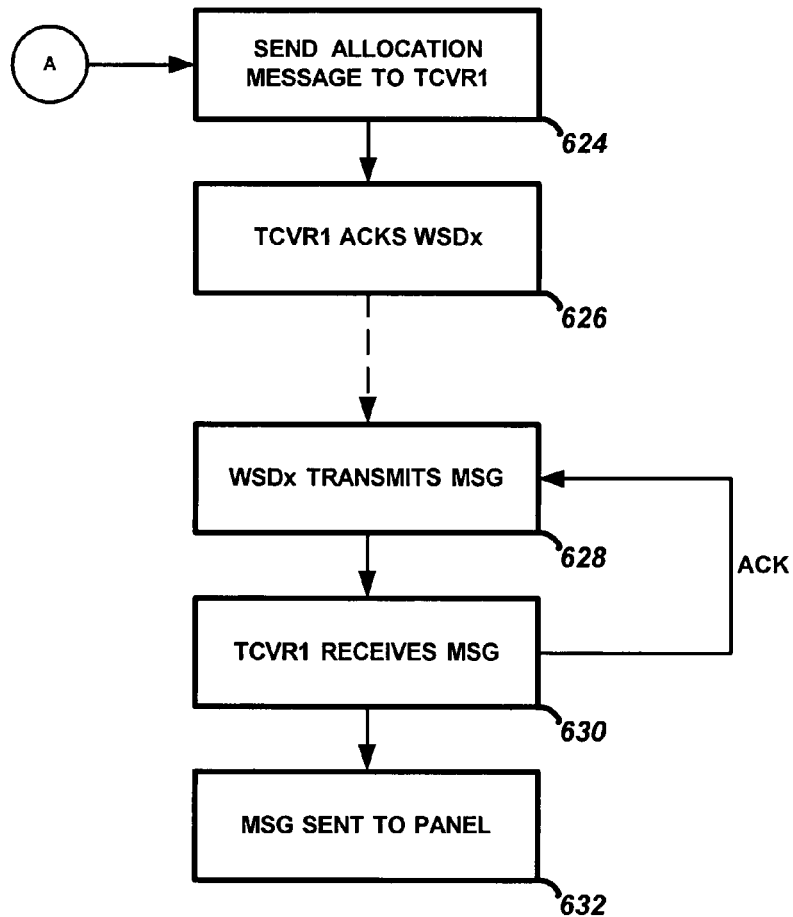

Reference is now made to the flowchart of FIGS. 6a and 6b to describe the operation of this first aspect of the invention. A first wireless security device is referred to generally as WSDx, where x=1, 2, 3 . . . . An installer affixes WSDx in the desired location, such as a PIR being installed in an upper corner of a room. The installer causes WSDx to transmit a wireless message (for example by initiating a tamper detection switch as known in the art). The wireless message from WSDx is transmitted (step 602) and received by several wireless transceivers. In this example the wireless message will be received by only two transceivers TCVR1 (step 604) and TCVR2 (step 606), but any number of transceivers would be included if they are in range and the wireless message reaches them. Each transceiver will then analyze the wireless message from WSDx and generate an RSSI signal as known in the art. Thus, TCVR1 will generate RSSIx1 at step 608, and TCVR2 will generate RSSIx2 at step 610. Then, each transceiver will assemble a digital data message that includes data DATAx received from the WSDx (i.e. after demodulation) as well as the measured RSSI data. Thus, TCVR1 will send message MSGx1 (DATAx, RSSIx1) onto the bus 12 at step 612, and TCVR2 will send message MSGx2 (DATAx, RSSIx2) onto the bus 12 at step 614.

The control panel 4 will receive MSGx1 and MSGx2 (step 616) and process them as follows. Processing circuitry 52 of the control panel 4 will analyze the RSSI data from MSGx1 (RSSx1) and from MSGx2 (RSSIx2), and determine at step 618 which RSSI data is greater (or greatest if more than two transceivers send RSSI data). Assuming for sake of explanation that MSGx1 has the greater RSSIx, (step 620), then the control panel 4 will designate that TCVR1 will have primary data exchange responsibility with WSDx (step 622). The control panel will store this designation information in the transceiver allocation table 54 and send a data message to TCVR1 (step 624) to instruct TCVR1 that it must send an acknowledgement message (ACK) to the WSDx (step 626) and continue to acknowledge subsequent messages from WSDx until otherwise notified by the control panel. The TCVR1 will set a flag in its memory to indicate its status as primary acknowledging transceiver and cause it to acknowledge immediately when it receives a subsequent message from WSDx (steps 628, 630, 632).

In addition, since TCVR1 has the optimal data transfer characteristics with WSDx, any subsequent data messages that must be sent to WSDx will be sent by the control panel via TCVR1. For example, if the control panel requires a status message from WSDx, it will send a status request message to TCVR1 to forward on to WSDx.

Certain events may occur that could cause the designated transceiver to no longer have the highest RSSI from a given wireless security device. For example, a transceiver device may fail. In addition, furniture may be moved in the premises that could change the RF signal transmission characteristics of the wireless security device/transceiver pair. Thus, the present invention may be configured to adapt to compensate for these types of changing conditions. In order to do this, each transceiver that receives a wireless message from a wireless security device will continue to generate RSSI data and send it to the control panel, even though that transceiver may not have primary data exchange responsibility with that wireless security device. Even though it forwards the RSSI data and message data to the control panel every time it receives a transmission from a security device, it will not ACK that security device unless it has its flag set in memory as described above.

Since the control panel may constantly receive digital data messages from all receivers in range of a given security device, it can continue to monitor the relative RSSI values and ascertain if the primary data exchange responsibility should change from the previously assigned transceiver to a different one. This may be done in various ways. For example, the control panel may be programmed to re-evaluate RSSI measurements periodically, for example once every hour or once every day, etc. Or, it may take a moving average of a certain number of signals. Or, it may check the RSSI signals every $100^{th}$ message received, etc. The parameters of modifying data exchange responsibilities may be set by the system designer to ensure reliability in any of these or other manners. Likewise, the control panel may determine that a given transceiver has stopped responding and re-assign data exchange responsibility to a different transceiver accordingly. By storing historical RSSI data in the table 54, decisions on re-assigning data exchange responsibilities are more readily made. Table 54 also contains mapping assignment data that keeps track of which transceiver has been paired with which security device.

As described above, in the situation where the transceiver no longer is in communication with the control panel, the control panel will reallocate data transfer responsibility (e.g. ACK) to another transceiver. When this is due to a complete failure of the first transceiver, then that first transceiver will of course stop ACKing since it is dead. However, in the case that the transceiver is still able to communicate with the transceiver even though its communication with the control panel has failed, it is also desired for that transceiver to stop communicating to the security device on its own (i.e. without requiring a termination message from the control panel). This is important to avoid multiple transceivers from ACKing the security device (and avoid collisions). Thus, the transceiver will be programmed with a timeout feature that will cause it to clear its ACK flag if it has been unable to communicate successfully with the control panel after a certain time (e.g. 1 minute).

Thus, as shown in FIG. 6a, the control panel may determine at a subsequent time that MSGx2 now has a higher RSSI value than MSGx1 (step 634). In this case, the control panel reallocates primary data exchange responsibility to TCVR2 rather than TCVR1 (step 636). To do this, the control panel sends an allocation message to TCVR2 (step 638) and a termination message to TCVR1 (step 640). From then on, acknowledgement responsibility will be carried out by TCVR2 for WSDx (step 642).

In addition, the control panel may be overridden by a user input, such as by entry via a keypad, to assign a predefined transceiver to a given wireless security device, regardless of the RSSI signal measurement described above.

While the first aspect of the invention described above is generally implemented using fixed location wireless security devices (such as PIRs or door contact switches), a second aspect of the invention applies to portable wireless security devices such as fobs. As shown in FIG. 3, these portable wireless security devices 8 may also have inputs 33 such as buttons that may be pressed by a user to execute certain system function such as arm or disarm, etc., as well known in the art.

Figure 6B:
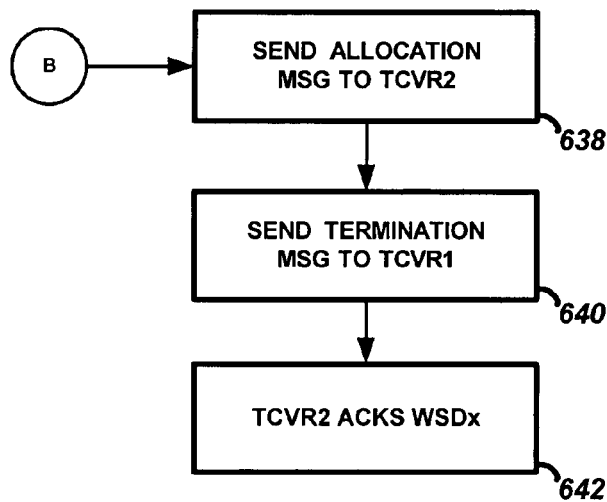
Figure 7A:
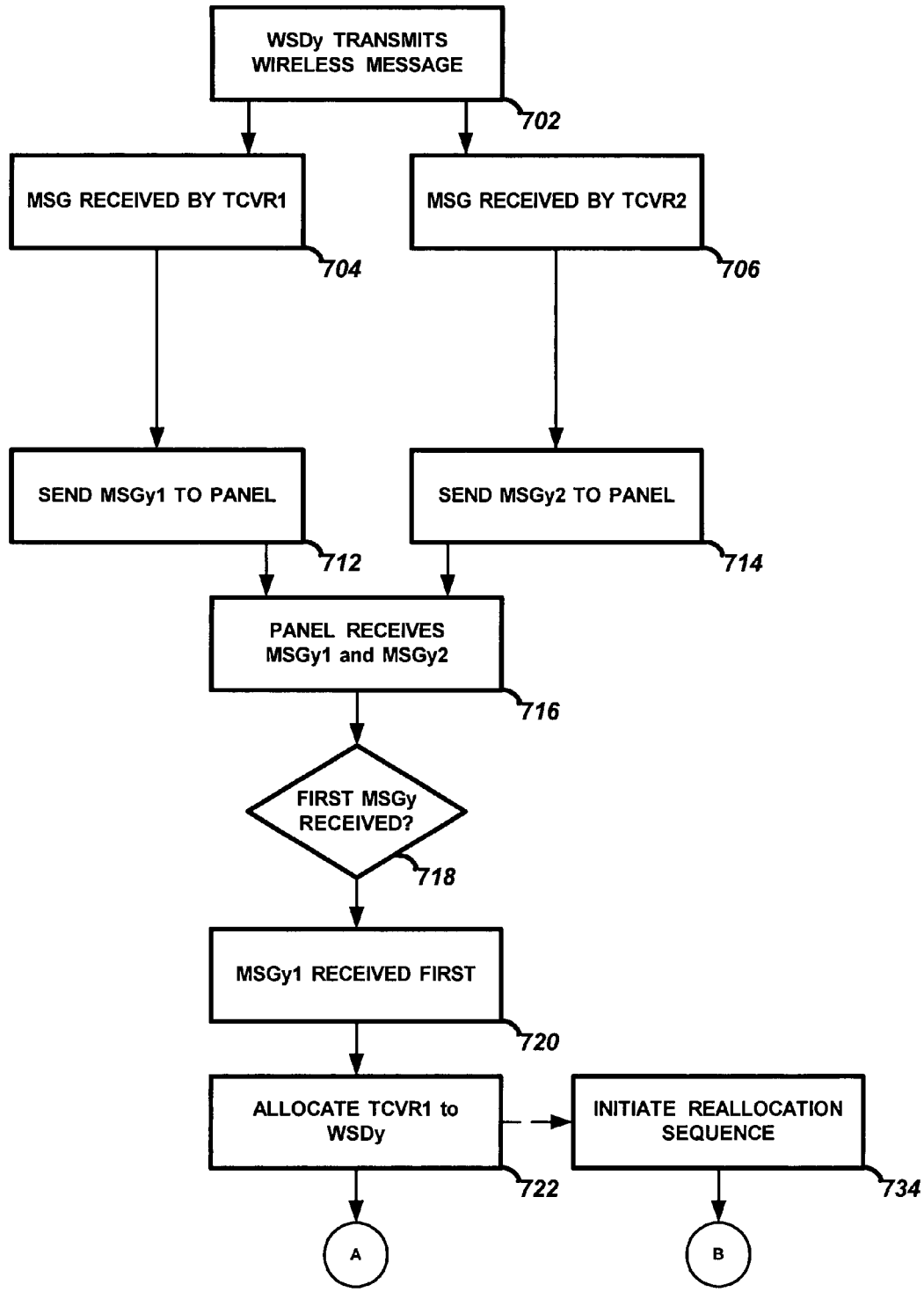
FIGS. 7a and 7b are a flowchart of the operation of a second aspect of the present invention used with portable security devices.
Figure 7B:
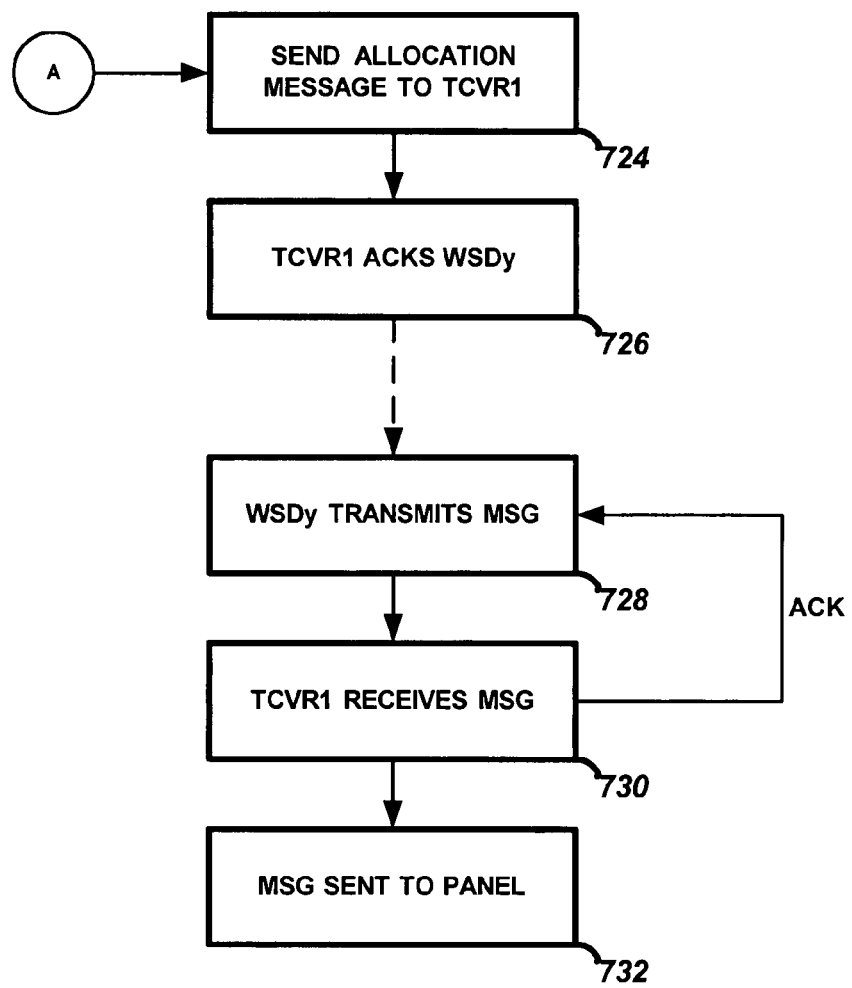
Figure 7B:
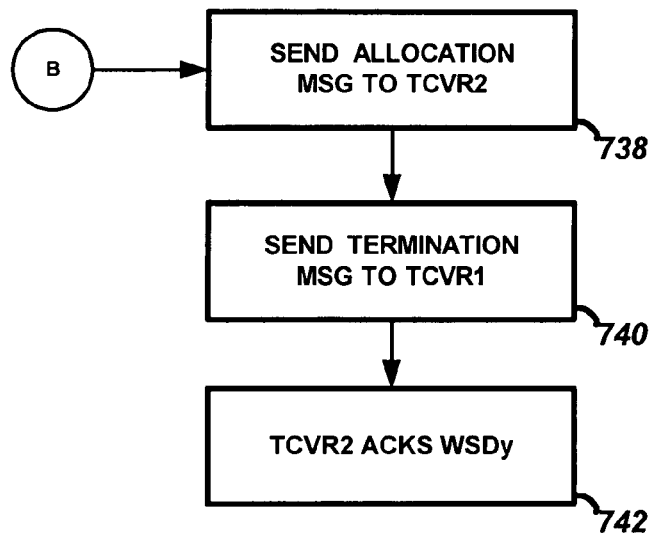

Reference is now made to the flowchart of FIGS. 7a and 7b to describe the operation of this second aspect of the invention. As in FIG. 6, a first portable wireless security device is referred to generally as WSDy, where y=1, 2, 3 . . . . The installer causes WSDy to transmit a wireless message (for example by pressing an input button 33). The wireless message from WSDy is transmitted (step 702) and received by several wireless transceivers. In this example the wireless message will be received by only two transceivers TCVR1 (step 704) and TCVR2 (step 706), but any number of transceivers would be included if they are in range and the wireless message reaches them. Note that received signal strength indication measurement is not implemented in this aspect of the invention. Each transceiver will assemble a digital data message that includes data DATAy received from the WSDy (i.e. after demodulation). Thus, TCVR1 will send message MSGy1 onto the bus 12 at step 712, and TCVR2 will send message MSGy2 onto the bus 12 at step 714.

The control panel 4 will receive MSGy1 and MSGy2 (step 716) and process them as follows. Processing circuitry 52 of the control panel 4 will determine at step 718 which message was received first (either MSGy1 or MSGy2) at step 718. Assuming for sake of explanation that MSGy1 was received first (step 720), then the control panel 4 will designate that TCVR1 will have primary data exchange responsibility with WSDy (step 722). The control panel will store this designation information in the transceiver allocation table 54 and send a data message to TCVR1 (step 724) to instruct TCVR1 that it must send an acknowledgement message (ACK) to the WSDy (step 726) and continue to acknowledge subsequent messages from WSDy until otherwise notified by the control panel. The TCVR1 will set a flag in its memory to indicate its status as primary acknowledging transceiver and cause it to acknowledge immediately when it receives a subsequent message from WSDy (steps 728, 730, 732).

In addition, any subsequent data messages that must be sent to WSDy will be sent by the control panel via TCVR1. For example, if the control panel requires a status message from WSDy, it will send a status request message to TCVR1 to forward on to WSDy.

Since in this embodiment the wireless security device is portable rather than fixed in a single location, it is more likely that the allocation of data exchange responsibility will change from one transceiver to another. This may be done in one or more of several possible ways. Generally speaking, a reallocation sequence will be initiated at some point by the control panel (step 734). Once this process occurs and the decision to reallocate is made, then the control panel reallocates primary data exchange responsibility to TCVR2 rather than TCVR1 (step 736). To do this, the control panel sends an allocation message to TCVR2 (step 738) and a termination message to TCVR1 (step 740). From then on, acknowledgement responsibility will be carried out by TCVR2 for WSDy (step 742). This process is of course repeated periodically.

For example, the reallocation process may implement the use of a timeout clock 53 in control panel 4. When the timeout clock 53 reaches a predetermined time (e.g. 12 seconds), then the control panel 4 indicates to the designated wireless transceiver TCVR1 that it longer has been designated with data exchange responsibility with the wireless security device WSDy (step 738). Alternatively, a message counter may be implemented by the control panel 4, which is incremented for each time a message MSGy is received from the portable wireless security device WSDy. When the message counter reaches a predetermined count, then the control panel 4 indicates to the designated wireless transceiver TCVR1 that it no longer has been designated with data exchange responsibility with the wireless security device WSDy (step 738). Likewise, data exchange responsibility may be modified if the control panel receives messages from a portable wireless security device via a different transceiver but does not receive it from the designated transceiver (indicating that the portable device was likely carried out of range of the designated transceiver).

It will be apparent to those skilled in the art that modifications to the specific embodiment described herein may be made while still being within the spirit and scope of the present invention.

What is claimed is:

1. A method of managing data communications in a wireless security system, comprising the steps of:
    a) transmitting a wireless message from a wireless security device;
    b) receiving the wireless message by at least two wireless transceivers;
    c) for each wireless transceiver that receives said wireless message:
        i) analyzing the received wireless message to generate received signal strength indication data;
        ii) sending, via a wired connection to a control panel, a digital data message comprising at least some data from said received wireless message and said received signal strength indication data;
    d) the control panel receiving each digital data message sent from the wireless transceivers and analyzing the received signal strength indication data from each received digital data message to determine which wireless transceiver generated the highest received signal strength indication data;
    e) designating data exchange responsibility to the wireless transceiver determined to have generated the highest received signal strength indication data; and
    f) indicating, to the wireless transceiver determined to have generated the highest received signal strength indication data, that said wireless transceiver has been designated with data exchange responsibility with said wireless security device.

2. The method of claim 1 further comprising the step of only the designated wireless transceiver transmitting an acknowledgement message to said wireless security device.

3. The method of claim 1 wherein only the designated wireless transceiver transmits an acknowledgement message to said wireless security device in response to each subsequent wireless message successfully received from said wireless security device.

4. The method claim 1 wherein steps (b) through (f) are repeated for each of a plurality of subsequent wireless messages transmitted from the wireless security device; and in the event that the wireless transceiver determined to have generated the highest received signal strength indication data is different from a previous wireless transceiver, then
    indicating, to the previous wireless transceiver that said previous wireless transceiver no longer has been designated with data exchange responsibility with said wireless security device.

5. The method of claim 1 further comprising the steps of
    enabling an override of the wireless transceiver determined to have generated the highest received signal strength indication data with a preselected wireless transceiver; and
    indicating, to the preselected wireless transceiver, that said wireless transceiver has been designated with data exchange responsibility with said wireless security device.

6. The method of claim 5 further comprising the step of disabling the override in the event that the control panel no longer receives any digital data messages sent from the preselected wireless transceiver.

7. The method of claim 1 further comprising the step of storing a plurality of data records in memory, each record indicating a mapping of data exchange responsibility between wireless transceivers and associated wireless security devices.

8. The method of claim 7 wherein said memory further comprises received signal strength indication data for each wireless transceiver and associated wireless security devices.

9. A security system comprising:
    a) a wireless security device comprising wireless message transmission circuitry and a wireless receiver;
    b) a plurality of wireless transceivers, each comprising:
        (i) a wireless receiver and a wireless transmitter configured to wirelessly communicate with the wireless security device;
        (ii) a received signal strength indication measurement circuit configured to analyze a wireless message received from the wireless security device and generate received signal strength indication data for said wireless security device;
        (iii) a transmitter and receiver circuit configured to interface with a wired connection and to send and receive digital data messages over said wired connection, wherein at least some of said digital data messages transmitted comprises at least some data from said wireless message and the received signal strength indication data generated by said received signal strength indication measurement circuit;
    c) a control panel interconnected to each of said plurality of wireless transceivers via a wired connection; said control panel comprising:
        (i) a transmitter and receiver circuit configured to interface with said wired connection and to send and receive digital data messages over said wired connection;
        (ii) processing circuitry configured to
            analyze the received signal strength indication data from a plurality of digital data messages received from more than one wireless transceiver;

determine which wireless transceiver generated the highest received signal strength indication data;

designate data exchange responsibility to the wireless transceiver determined to have generated the highest received signal strength indication data; and transmit, to the wireless transceiver determined to have generated the highest received signal strength indication data, a digital data message indicating that that said wireless transceiver has been designated with data exchange responsibility with said wireless security device.

10. The security system of claim 9, wherein each of said plurality of wireless transceivers further comprise:

a memory for storing an indication that said wireless transceiver has been designated with data exchange responsibility with said wireless security device; and processing circuitry configured to cause the wireless transceiver to transmit an acknowledgement message to said wireless security device only if the memory has stored therein an indication that said wireless transceiver has been designated with data exchange responsibility with said wireless security device.

11. The security system of claim 9 further comprising a memory for storing a plurality of data records, each record indicating a mapping of data exchange responsibility between the wireless security device and the designated wireless transceiver.

12. The security system of claim 11 wherein said memory further comprises received signal strength indication data for each wireless transceiver and associated wireless security device.

13. A method of managing data communications in a wireless security system, comprising the steps of:

a) transmitting a wireless message from a portable wireless security device;

b) receiving the wireless message by a plurality of wireless transceivers;

c) for each wireless transceiver that receives said wireless message:

sending, via a wired connection to a control panel, a digital data message comprising at least some data from said received wireless message;

d) the control panel receiving each digital data message sent from the wireless transceivers and determining which wireless transceiver was the first wireless transceiver to have sent the digital data message;

e) designating data exchange responsibility to the wireless transceiver determined to have been the first wireless transceiver to have sent the digital data message; and f) indicating, to the wireless transceiver determined to have been the first wireless transceiver to have sent the digital data message, that said wireless transceiver has been designated with data exchange responsibility with said wireless security device.

14. The method of claim 13 further comprising the steps of:

g) initiating a timeout clock;

h) when said timeout clock reaches a predetermined time, then indicating to the designated wireless transceiver that said designated wireless transceiver no longer has been designated with data exchange responsibility with said wireless security device.

15. The method of claim 14 further comprising repeating steps (a) through (f) after said timeout clock has reached the predetermined time.

16. The method of claim 13 further comprising the steps of:

g) initiating a message counter;

h) incrementing said message counter for each time a message is received from a portable wireless security device;

i) when said message counter reaches a predetermined count, then indicating to the designated wireless transceiver that said designated wireless transceiver no longer has been designated with data exchange responsibility with said wireless security device.

17. The method of claim 16 further comprising repeating steps (a) through (f) after said message counter has reached the predetermined count.

18. A security system comprising:

a) a portable wireless security device comprising wireless message transmission circuitry and a wireless receiver;

b) a plurality of wireless transceivers, each comprising:

(i) a wireless receiver and a wireless transmitter configured to wirelessly communicate with said wireless security device;

(ii) a transmitter and receiver circuit configured to interface with a wired connection and to send and receive digital data messages over said wired connection, wherein at least some of said digital data messages transmitted comprises at least some data from said wireless message;

c) a control panel interconnected to each of said plurality of wireless transceivers via a wired connection; said control panel comprising:

(i) a transmitter and receiver circuit configured to interface with said wired connection and to send and receive digital data messages over said wired connection;

(ii) processing circuitry configured to determine which wireless transceiver was the first to have sent the digital message;

designate data exchange responsibility to the wireless transceiver determined to have been the first wireless transceiver to have sent the digital message; and transmit, to the wireless transceiver determined to have been the first wireless transceiver to have sent the digital message, a digital data message indicating that that said wireless transceiver has been designated with data exchange responsibility with said wireless security device.

19. The security system of claim 18 further comprising a memory for storing a plurality of data records, each record indicating a mapping of data exchange responsibility between the wireless security device and the designated wireless transceiver.

* * * * *